United States Patent [19]

Henry et al.

[11] Patent Number: 6,137,939
[45] Date of Patent: Oct. 24, 2000

[54] METHOD AND APPARATUS FOR REDUCING TEMPERATURE-RELATED SPECTRUM SHIFTS IN OPTICAL DEVICES

[75] Inventors: Charles Howard Henry, Skillman, N.J.; Yuan P. Li, Duluth, Ga.

[73] Assignee: Lucent Technologies Inc., Murray Hill, N.J.

[21] Appl. No.: 08/941,976

[22] Filed: Oct. 1, 1997

[51] Int. Cl.[7] .................................................. G02B 6/10
[52] U.S. Cl. ........................ 385/132; 385/46; 385/122; 385/143
[58] Field of Search .................... 385/28, 50, 95–99, 385/46, 122, 142, 143

[56] References Cited

U.S. PATENT DOCUMENTS

| | | | |
|---|---|---|---|
| 4,045,119 | 8/1977 | Eastgate | 385/125 |
| 4,902,086 | 2/1990 | Henry | 350/96.12 |
| 5,002,350 | 3/1991 | Dragone | 350/96.15 |
| 5,136,671 | 8/1992 | Dragone | 385/46 |
| 5,412,744 | 5/1995 | Dragone | 385/24 |
| 5,684,908 | 11/1997 | Kross et al. | 385/125 |
| 5,896,483 | 4/1999 | Wojcik et al. | 385/125 |

OTHER PUBLICATIONS

Kokubun et al., "Three–dimensional Athermal Waveguides For Temperature Independent Lightwave Devices," Electronics Letters, vol. 30, No. 15, Jul. 21, 1994, pp. 1223–1224.

Inoue, et al., "Athermal Silica–Based Arrayed–Waveguide Grating (AWG) Multiplexer," IOOC–ECOC, European Conference on Optical Comm. ECOC International Conference On Integrated Optics and Optical Fibre communication IOOC, No. 448, Sep. 22, 1997, pp. 33–36.

Hida, et al., "Influence Of Temperature And Humidity Change On Optical Waveguide Circuits Composed Of Deuterated And Fluorinated Methacrylate Polymers," Japanese Journal Of Applied Physics, vol. 34, No. 12A, Part 01, Dec. 1995, pp. 6416–6422.

Kokubun, et al., "Temperature–Independent Narrow–Band Filter By Athermal Waveguide," $22^{nd}$ European Conference On Optical Communication (ECOC '96), vol. 3, Sep. 15–19, 1996, pp. 143–146, Oslo, Norway.

Kokubun, et al., "Athermal Waveguides For Temperature Independent Lightwave Devices," $18^{th}$ European Conference On Optical Communication, vol. 1, Sep. 27,1992, pp. 629–632, Berling, Germany.

*Primary Examiner*—Hung N. Ngo

[57] ABSTRACT

The present invention teaches a novel technique for reducing the temperature-related spectrum shifts in optical devices, particularly waveguide grating routers (WGR). In general, the present invention modifies a portion of the length of at least one waveguide within an optical device in a manner that stabilizes the wavelength spectrum passing therethough even when exposed to temperature variations. More specifically, by knowing how the refractive index of a certain material changes with temperature variations as compared to that of common waveguide materials, such a silica, one may employ the teachings of the present invention to precisely modify the nature of the optical path through which a signal travels to fully compensate for any temperature-related wavelength spectrum shift. In other words, be able to produce an optical device with a plurality of waveguides each of which is appropriately modified so that any optical signal passing therethrough has the same wavelength at any two given temperatures.

10 Claims, 4 Drawing Sheets

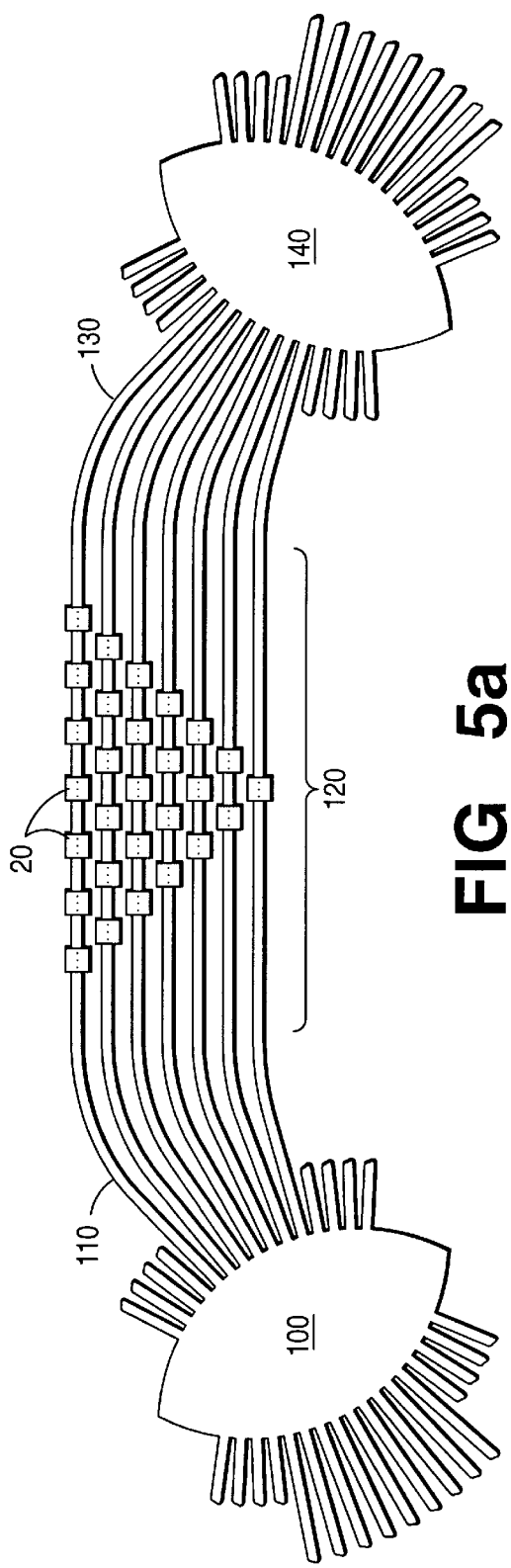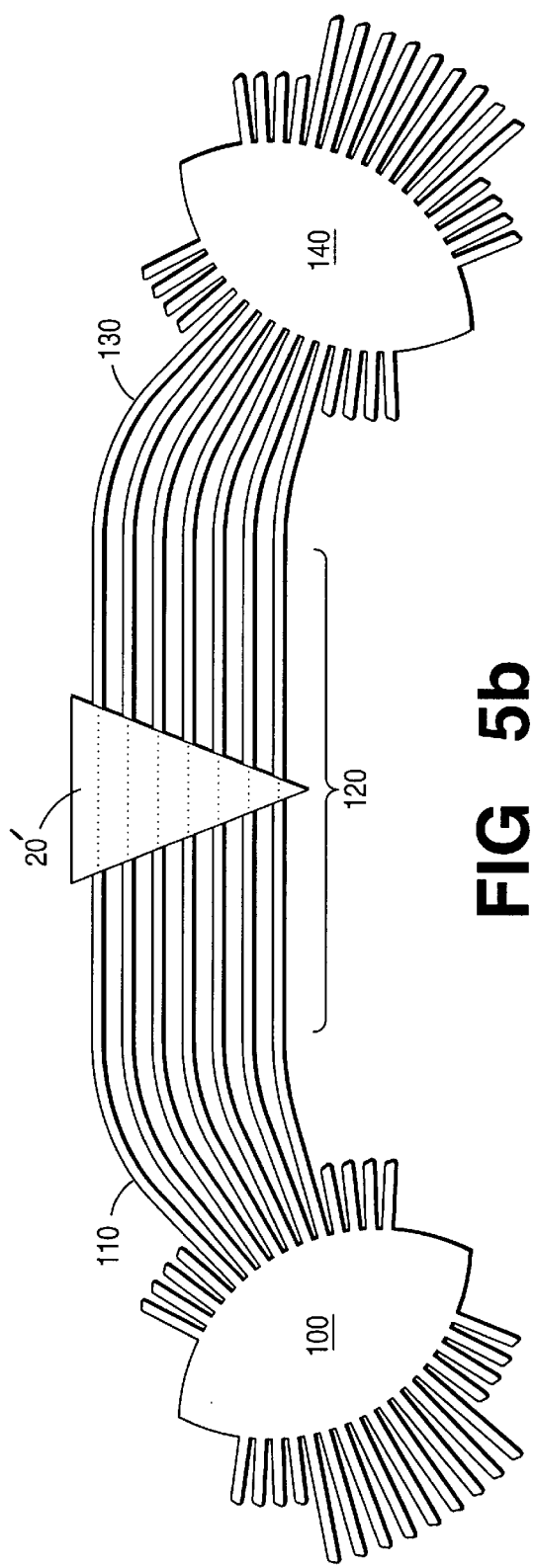
FIG 5a
FIG 5b

METHOD AND APPARATUS FOR REDUCING TEMPERATURE-RELATED SPECTRUM SHIFTS IN OPTICAL DEVICES

TECHNICAL FIELD

This invention relates to a method and apparatus for passively reducing the temperature-related spectrum shifts in optical devices, such as waveguide grating routers (WGR) and wavelength division multiplexers (WDM).

BACKGROUND OF THE INVENTION

Generally speaking, optical wavelength multiplexing and demultiplexing have been accomplished in the past by using an interconnection apparatus having a plurality of closely spaced input waveguides communicating with the input of a star coupler. The output of the star coupler communicates with an optical grating comprising a series of optical waveguides, each of the waveguides differing in length with respect to its nearest neighbor by a predetermined amount. The grating is connected to the input of a second star coupler, the outputs of which form the outputs of the switching, multiplexing, and demultiplexing apparatus. Examples of such interconnection apparatuses are disclosed in U.S. Pat. Nos. 5,002,350, 5,136,671 and 5,412,744.

The geometry of such an interconnection apparatus may be such that a plurality of separate and distinct wavelengths each launched into a separate and distinct input port of the apparatus will all combine and appear on a predetermined one of the output ports. In this manner, the apparatus performs a multiplexing function. The same apparatus may also perform a demultiplexing function. In this situation, an input wavelength is separated from the others and directed to a predetermined one of the output ports of the apparatus. An appropriate selection of input wavelength also permits switching between any selected input port to any selected output port. Accordingly, these devices are generally referred to as frequency routing devices and more specifically wavelength division multiplexers (WDM).

Ideally, the operation of these WGR and WDM optical devices should by predictable and consistent over a wide range of environmental conditions. Unfortunately however, in practice, the operational performance of such devices is significantly affected by variations in the temperature of the environment surrounding the device.

More specifically, the wavelength spectrum of existing WGR designs shifts with temperature (T) for at least two reasons. First, where n represents the refractive index of the waveguide material, $dn/dT \neq 0$ and secondly, the thermal expansion, i.e. $dL/dT$, where L represents length, likewise does not equal zero.

To date, some of the techniques used to create optical devices that are less sensitive to temperature changes have included using a heater with a temperature controller to stabilize the wavelength spectrum of the WGR. Unfortunately, such a design is expensive and impractical in applications where electrical power is not readily available. In addition, the semiconductor art has demonstrated a temperature insensitive semiconductor WGR that includes a waveguide region with different dn/dT.

However, even in light of the technical advances mentioned above, there remains a definite need for a practical design and method for making optical waveguide filtering devices temperature independent. This is particularly true for compensating waveguide grating routers, which are, at present, the multiplexers of choice for dense WDM systems.

Furthermore, given that silicon optical bench routers are now components of various Next Generation Lightwave Networks (NGLN) and are planned for use in Fiber-to-the-Home (FTTH) access networks, temperature-compensating optical devices like WGRs are highly desirable for these networks.

SUMMARY OF THE INVENTION

The present invention relates to a temperature-compensating optical waveguide. A waveguide has a core region which is capable of transmitting light energy and is surrounded by a cladding that essentially confines the light energy within the core region. Additionally, a first section of the core region comprises a first length of material whose refractive index increases as temperature increases. In accordance with the present invention, a second section of the core region comprising a second length of material whose refractive index decreases as temperature increases.

In an illustrative embodiment of the present invention, an optical device having a plurality of waveguides includes at least one of the temperature-compensating waveguides in order to maintain its performance capabilities essentially independent of temperature. In a more specific illustrative embodiment, an optical device, such as a WGR, includes a first free space region having at least one input waveguide and a second free space region having at least one output waveguide. Additionally, a plurality of unequal length waveguides connects the first free space region to the second free space region, wherein at least one of the unequal length waveguides is defined by a core region having first and second sections that are series connected and are capable of transmitting light energy, the core region being surrounded by a cladding that essentially confines the light energy within the core region, the first section of the core region comprising a first length of material whose refractive index increases as temperature increases. Most importantly, at least one of the unequal length waveguides is temperature-compensating in that the second section comprises a second length of material whose refractive index decreases as temperature increases.

BRIEF DESCRIPTION OF THE DRAWINGS

Other features of the present invention will be more readily understood from the following detailed description of specific embodiments thereof when read in conjunction with the accompanying drawings, in which:

FIGS. 5a) and 5b) depict various designs of optical frequency routing devices which employ the novel attributes of the present invention.

DETAILED DESCRIPTION

Figure 1A:
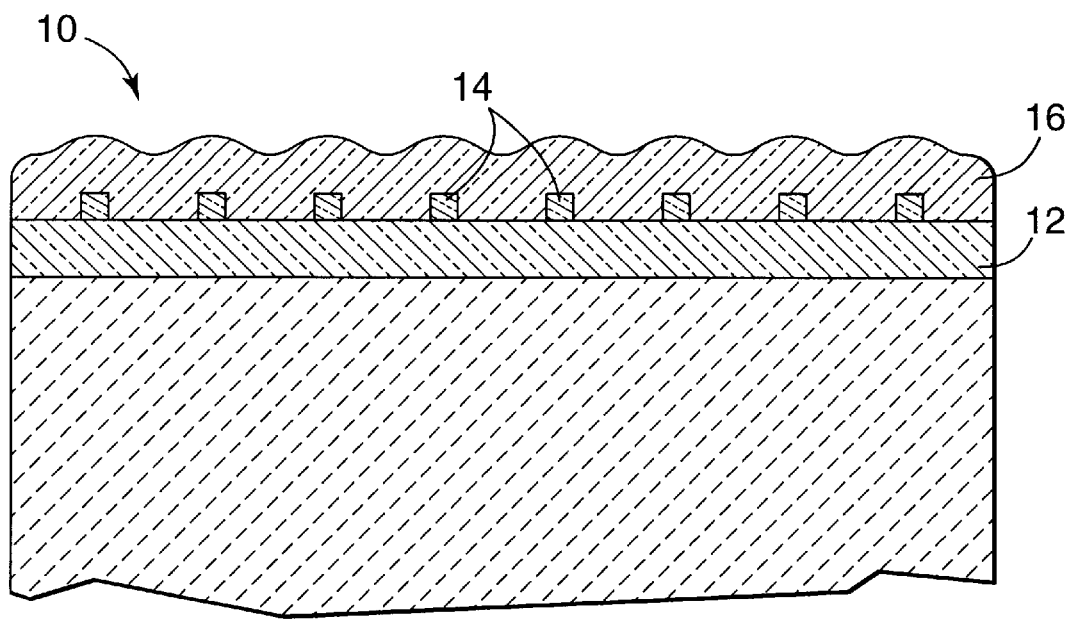
FIG. 1a discloses a cross-section view of a basic optical device having multiple waveguides.
Figure 1B:
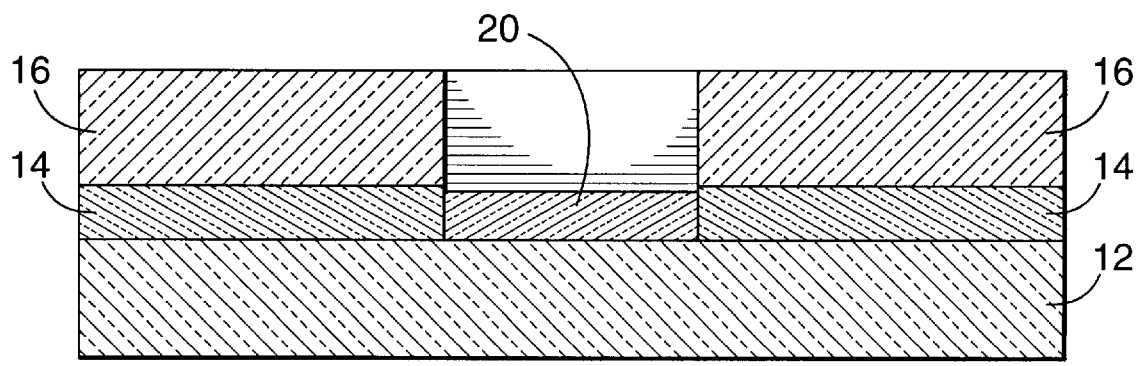
FIG. 1b discloses a cross-section view of the length of a waveguide incorporating the aspects of the present invention.

The present invention teaches a novel technique for reducing the temperature-related spectrum shifts in optical devices, particularly waveguide grating routers (WGR). In general, the present invention modifies a portion of the length of at least one waveguide within an optical device in a manner that stabilizes the wavelength spectrum passing therethough even when exposed to temperature variations. However, before specifically addressing the novel aspects of the present invention, a brief discussion is provided to set forth the basic structure of a common type of optical device which may be improved by incorporating the aspects of the present invention.

The most advanced and technically developed planar waveguides are doped-silica waveguides fabricated with silicon optical bench (SiOB) technology. A doped-silica waveguide is usually preferred because it has a number of attractive properties including low cost, low loss, low birefringence, stability, and compatibility for coupling to fiber. Further, the processing steps are compatible with those in silicon integrated circuit (IC) technology, which are geared for mass production and are readily known.

Generally, a doped-silica waveguide is formed by initially depositing a base or lower cladding layer of low index silica on a carrier substrate, which typically comprises silicon or silica. A layer of doped silica with a high refractive index, i.e., the core layer, is then deposited on top of the lower cladding layer. The core layer is subsequently patterned or sculpted into structures required by the optical circuits using photo-lithographic techniques similar to those used in integrated circuit fabrication. Lastly, a top cladding layer is deposited to cover the patterned waveguide core. This technology is generally described in U.S. Pat. No. 4,902,086 issued to C. H. Henry et al., and in an article entitled "*Glass Waveguides on Silicon for Hybrid Optical Packaging*" at pp. 1530–1539 of the *Journal of Lightwave Technology*, Vol. 7, No. 10, October 1989—both of which are hereby incorporated by reference.

Critical to the performance of any planar optical waveguide are the waveguide dimensions, i.e., the height and width of the waveguide core, and the refractional difference of the refractive index between the core and the cladding of the waveguide, generally denoted as Δ. The height or thickness of the core is determined by the amount of core material deposited on a carrier substrate; and the width of the core is determined by the photo-lithographic mask and undercut in chemical etching. The Δ of the waveguide is mostly determined by the material system and the fabrication process. In practice, different waveguide structures and systems are used for different types of functions and tradeoffs are made in the core dimensions and Δ to optimize different aspects of optical performance.

Illustratively, P-doped waveguides are used in the present invention, each having a core whose thickness is about 7 μm, and each resting on a 15 μm lower cladding layer. A 15 μm upper cladding layer covers the waveguide cores. The dimensions of the waveguide cores are chosen to be as large as possible for strong optical confinement and low propagation loss, but small enough so that the waveguides remain singlemode. Similarly, the silica paths that comprise the transition region have cores that are about 7 μm high; but their widths vary from about 18 μm (near the slab) to about 2 μm (distant from the slab).

Referring now to FIG. 1*a*, a cross section of an optical device is shown in order to illustrate its dimensions and materials in the region where waveguides are present. Substrate 10 comprises silicon having a thickness of 500 μm. Cladding 12 comprises a 15 μm layer of silica having an index of refraction of about 1.445 at a wavelength (λ) of 1.55 μm. Waveguide cores 14 are generally square, they have a thickness and width of about 7 μm, and they comprise doped-silica having an index of refraction of about 1.454 at λ=1.55 μm. The waveguide cores 14 are separated by a distance of about 2.5 μm. The fact that the core material has a higher index of refraction than the cladding material enables the core to guide lightwaves in accordance with Snell's law. Cladding layer 16, which is substantially the same as cladding layer 12 in refractive index, is deposited on top of cores 14 to complete the structure.

The present invention sets forth and claims a novel design change in the structure of optical devices which causes these devices to be significantly less temperature sensitive than existing designs. More specifically, the design changes described herein obviate the inherent shifts in the wavelength spectrum of the optical devices which occur with temperature variations. In other words, the present invention is generally directed toward an optical waveguide which has the attribute of being temperature-independent in its ability to transmit light energy.

As stated earlier, the wavelength spectrum of optical devices, particularly WGRs and WDMs, shifts with temperature variations (T) for at least two reasons. First, where n represents the refractive index of the waveguide material, $dn/dT \neq 0$ and secondly, the thermal expansion, i.e. $dL/dT$, where L represents length, likewise does not equal zero. In other words, the rate at which the refractive index changes with temperature variations is a given characteristic of that material. For example, silica which is commonly used in the manufacture of waveguides within optical devices has a $dn/dT$ value equal to about $1.1 \times 10^{-5}$ 1/° C.

Figure 2:
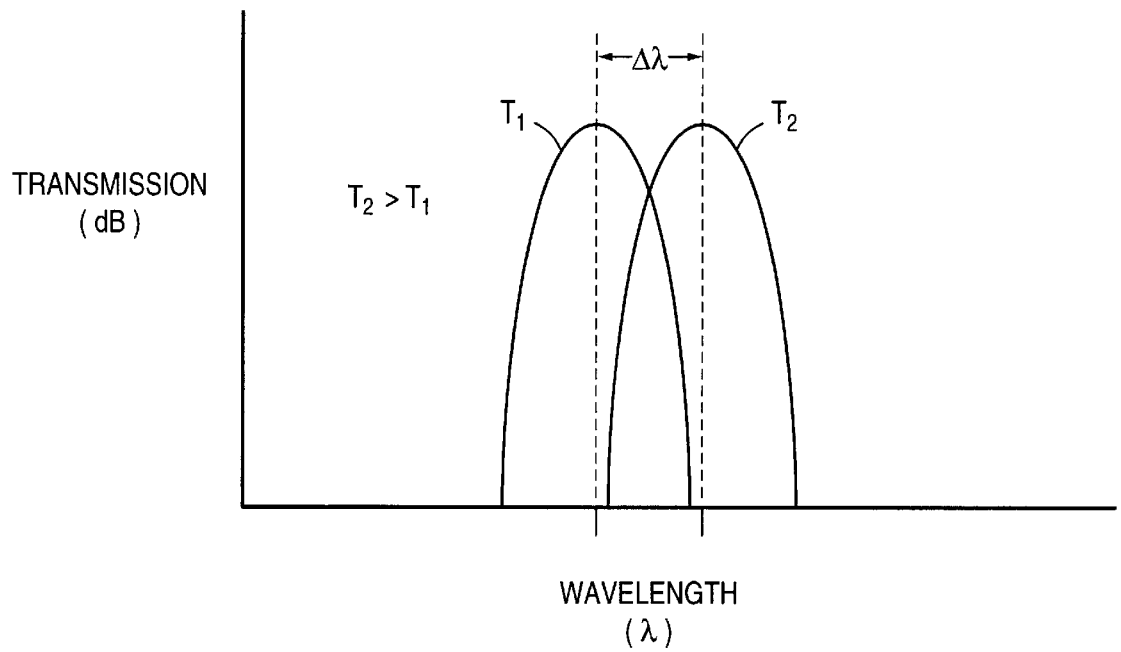
FIG. 2 is a graph showing a portion of the transmission coefficients for an optical device of FIG. 1 at two different temperatures, $T_1$ and $T_2$.

FIG. 2 generally illustrates the effect that temperature variations can have on the transmission coefficients of an optical signal. As shown, when the temperature increases from $T_1$ to $T_2$, the transmission coefficient moves by some amount of wavelength λ to the right. Stated differently, an increase in temperature causes a shift of the wavelength spectrum upward to a higher wavelength.

Based on the above-stated facts, the present inventors realized that it is the characteristics of the particular material used to create the waveguides, namely silica, that controls or dictates the devices response to temperature variations. More importantly, the present inventors determined that other materials exist that can provide optical performances similar to silica while exhibiting more desirable reactions to temperature variations. To specifically address the problem of temperature-related spectrum shifts in optical devices, the inventors recognized that selected portions of one or more waveguides could be made of a different material than the remaining portion of that waveguide so as to controllably compensate for characteristics of that waveguide which are commonly temperature sensitive.

In particular, elastomeric materials, or elastomers, were investigated since they have low optical loss at communications wavelengths and refractive indices quite close to that of silica. However, beyond these factors, another interesting property of elastomers is their generally rapid change of refractive index with temperature and how such relates to the characteristics of silica. One specific elastomer, namely RFX-36HN manufactured by General Electric or Dow Corning, has a refractive index that changes as temperature increases by an amount that is opposite in sign and about 30 times greater than that of silica. Since the refractive index of the elastomer reacts to temperature variations in a direction opposite to that of the typical waveguide material silica, more elastomer should be used in the longer waveguides of the grating in order to ensure a consistent reaction or compensation for temperature variations for each of the waveguides within the optical device.

In accordance with the above principles, one embodiment of the present invention describes an optical device, such as a WGR, which instead of having the entire length of each waveguide core region made of one constant material like silica, purposely manufactures some portion of at least one waveguide of a different material. More specifically, the different material is selected so as to have a refractive index which changes with temperature variations at a different rate than the given rate of change for the material of the remaining portion of that grating waveguide. Furthermore, when a material is selected whose refractive index which reacts to temperature variations in an opposite direction than that of the material of the remaining waveguide core, one can various amounts of the two different materials to effectively compensate for any temperature variations.

Figure 3:
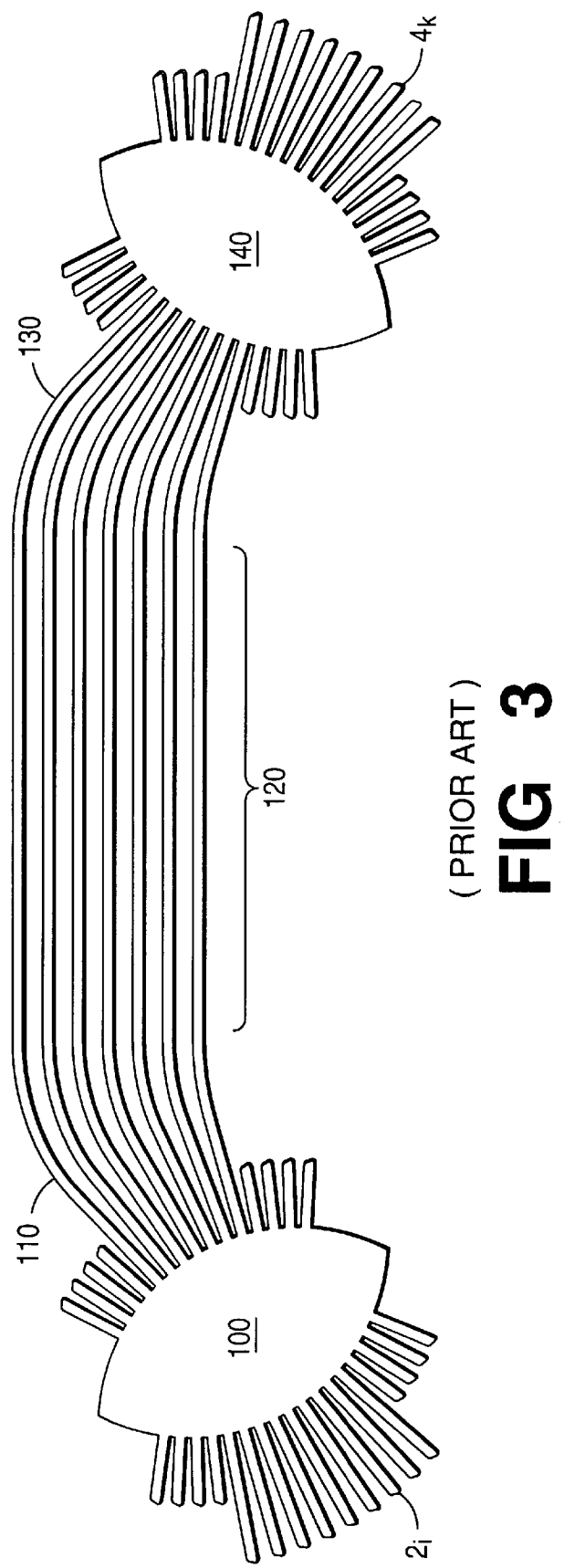
FIG. 3 illustrates an example of a conventional optical frequency routing device.

FIG. 3 shows the pertinent details of a conventional frequency routing device. The frequency routing device contains a plurality of input waveguides $2_i$, i=1, 2, ..., N connected to a free space region 100. A plurality of output waveguides 110 extends from the free space region 100 and is connected to an optical grating 120. The optical grating 120 comprises a plurality of unequal length waveguides which provides a predetermined amount of path length difference to a corresponding plurality of input waveguides 130 connected to another free space region 140. The free space region 140 is connected to a plurality of output waveguides $4_k$, k=1, 2, ..., N.

In practice, these frequency routing devices may operate as multiplexers and/or demultiplexers of optical frequencies. For example, if a signal of amplitude A is applied to input waveguide $2_i$ then signals of amplitudes $AT_{11}$, $AT_{12}$, ... $AT_{1N}$ are produced at the output waveguides where $T_{ik}$ is the value of the transmission coefficient for input waveguide $2_i$ and output waveguide $4_k$. Additional details concerning these routing devices are found in the above-referenced patents which are expressly incorporated by reference herein.

Figure 4:
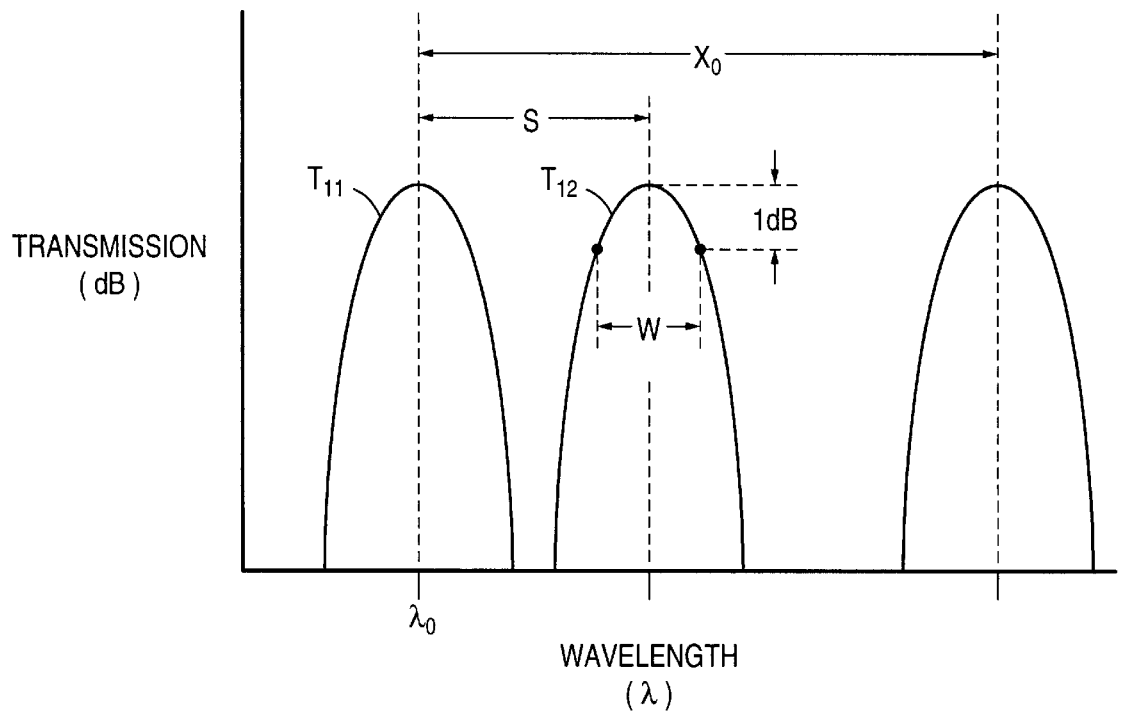
FIG. 4 is a graph showing the transmission coefficients $T_{ik}$ for the routing device of FIG. 1.

The typical behavior of the routing device shown in FIG. 3 is illustrated in FIG. 4. This figure shows the set of transmission coefficients $T_{1k}$ for the routing device for the particular input waveguide $2_1$ as a function of wavelength λ. The variation of each transmission coefficient as a function of wavelength is essentially periodic with a period $X_o$. For a symmetric arrangement in which the input and output waveguides are uniformly positioned within the device's field of view (i.e., the Brillouin Zone), $X_o$ is given by $$X_o = N \cdot S \quad (1)$$

where N is the total number of input (or output) waveguides and S is the channel spacing, which is defined as the wavelength separation between maximum peaks of adjacent transmission coefficients (see FIG. 4). The wavelength $\lambda_o$ is a wavelength that corresponds to a maximum value for one of the transmission coefficients $T_{ik}$. In FIG. 3, $\lambda_o$ corresponds to a maximum of the coefficient $T_{11}$. All other wavelength of maximum transmission $\lambda_{ik}$ for the various coefficients $T_{ik}$ essentially differ from $\lambda_o$ by multiples of S and therefore are given by the expression $$\lambda_{ik} = \lambda_o + (i - k + q \cdot N) S \quad (2)$$

where the integers i,k=1, ..., N specify the locations of the input and output waveguides, q is an integer, and $\lambda_o$ is a wavelength of maximum transmission for the waveguides l=k=1. The wavelength $\lambda_o$ will be referred to as the multiplexer center wavelength. The parameter X is defined as follows:

$$X = \lambda - [\lambda_o + (i - k + q \cdot N) S] = \lambda - \lambda_{ik} \quad (3)$$

The transmission coefficients have essentially identical behavior and, therefore, they are described by the same function T(X). Thus, all the transmission coefficients corresponding to a particular input waveguide yield an array of equally spaced transmission peaks such as shown in FIG. 4. The spacing of adjacent peaks is equal to the channel spacing S.

While the general aspects of the present invention are set forth above, there are a number of different ways in which these concepts can be actually incorporated into an optical device. FIGS. 5a) and b) set forth a few alternative designs which illustrate how a temperature-independent optical device may be made in accordance with the present invention.

As one example of how the elastomer material may be incorporated into the selected waveguide(s), FIG. 5a shows a varying number of relatively small blocks 20 of elastomer material being placed in the selected waveguide path. More specifically, as illustrated, the longest waveguide shown (top) may contain seven such elastomeric blocks, the second longest shown (second from top) may contain six such elastomeric blocks, the third longest shown (third from top) may contain five such elastomeric blocks, and so on until the shortest full waveguide shown (seventh from top) may contain one such elastomeric block.

However, it is important to note that the exact number and/or size of elastomeric blocks 20 used in any particular waveguide is a matter of design choice and that FIGS. 5a) and b) herein are not intended to be accurate scale drawings. Most importantly, while any numerical sequence of elastomeric blocks, i.e. 1, 2, 3, 4, ... or 2, 4, 6, 8, ... or 3, 6, 9, ..., may be used in accordance with the present invention, the objective is to maintain a linear relationship between the total length of the combined elastomeric blocks and the overall length of the associated waveguide. Stated differently, the percent increase in length from one waveguide to an adjacent waveguide should be accompanied by a similar increase in the amount of elastomeric material used in each of those two waveguides.

By designing the device in this manner, the selected number of elastomeric blocks 20 may be controllable positioned into the desired waveguide path. More specifically, one particular method of manufacturing this design would involve each of the steps set forth earlier followed by etching away the cladding 16 and core material 14 from the device down to the substrate layer 12.

In order to more clearly illustrate this design, FIG. 1a) shows a cross-sectional view along the length of a waveguide. As shown, a portion of both cladding 16 as well as core material 14 has been replaced with elastomeric material 20. Furthermore, an additional step may be included whereby the portion of the elastomeric material 20 adjacent the upper cladding 16 is etched away and replaced with more cladding material.

When implementing the elastomeric block design set forth above, typical sizes for some of the blocks 20 used in conventional optical devices may be about 3 µm. Based on an example structure where there is about 100 grating waveguides (instead of the seven fully illustrated), there would be a total of about 300 µm of elastomeric material within the overall length of the longest waveguide instead of the base waveguide material such as silica. Likewise, according to this example, one of the shorter waveguides would include about 3 μm of elastomeric material along its length. However, even though particular numbers may be given herein, it should be fully understood that depending on the exact design and type of optical device being modified, as well as the expected environment into which the device will be operating, the specific values used can vary significantly but none the less be considered within the scope of the present invention.

Yet another design for incorporating the elastomeric material into the selected waveguide(s) is depicted in FIG. 5b). In this alternative, the elastomeric material is deposited as a member 20 into a series of adjacent waveguides in the shape of a "∇." In particular, such a configuration provides a longer length of elastomeric material within the longest waveguide (top) path and the shortest length of elastomeric material into one of the shorter waveguide paths.

As with the block design described earlier, the exact amount or length of elastomer used within a particular waveguide is considered to be a matter of design choice within the scope of this invention. However, one set of acceptable numbers for this triangular design could have about 300 μm of elastomeric material along the length of the longest waveguide modified and about 3 μm of elastomeric material in the shortest waveguide modified.

To actually calculate the amount of wavelength shift achieved, or compensated for, it should first be remembered that the refractive index of the particular elastomer described earlier shifts opposite the direction of that of silica when exposed to temperature variations and with about a 30 times greater magnitude. Furthermore, the total length of the elastomeric material section(s) is given by $$L_e = (I)(L) \left| \frac{(dn/dT)_{silica}}{(dn/dT)_{elastomer}} \right|$$

where L is the increment of the adjacent grading waveguide length, I is the index count of the grating waveguides, I=1 for the shortest waveguide, I=2 for the next waveguide, etc.

In closing, the present invention addresses the need to provide a passive optical device whose operation is essentially independent of any temperature variations to which it may be exposed. By knowing how the refractive index of a certain material changes with temperature variations as compared to the way the refractive index of common waveguide materials, such a silica, change with temperature variations, one may employ the teachings of the present invention to precisely modify the nature of the optical path through which a signal travels to fully compensate for any wavelength spectrum shift that may otherwise occur. In other words, provide an optical device with a plurality of waveguides each of which is appropriately modified so that any optical signal passing therethrough has the same wavelength at any two given temperatures.

It is to be understood that the above-described arrangements are simply illustrative of the invention. Other arrangements may be devised by those skilled in the art which will embody the principles of the invention and fall within the spirit and scope thereof. In particular, Mach-Zehnder interferometers, Bragg filters and/or optical Fourier filters may also benefit from the aspects of the present invention.

We claim:

1. An optical device having a plurality of optical waveguides and comprising at least one waveguide, which is defined by a core region having first and second sections that are series connected and are capable of transmitting light energy, the core region being surrounded by a cladding that essentially confines the light energy within the core region, the first section of the core region comprising a first length of material whose refractive index increases as temperature increases; wherein the at least one waveguide is temperature-compensating in that;

the second section of the core region comprises a second length of material whose refractive index decreases as temperature increases.

2. The optical apparatus of claim 1 wherein the first section of the core region is made of silica.

3. The optical apparatus of claim 2 wherein the second section of the core region is made of an elastomeric material.

4. The optical apparatus of claim 3 wherein the length of the second section is proportional to the length of the first section.

5. An optical apparatus comprising:

a first free space region having at least one input waveguide;

a second free space region having at least one output waveguide;

a plurality of unequal length waveguides connecting the first free space region to the second free space region, wherein at least one of the unequal length waveguides is defined by a core region having first and second sections that are series connected and are capable of transmitting light energy, the core region being surrounded by a cladding that essentially confines the light energy within the core region, the first section of the core region comprising a first length of material whose refractive index increases as temperature increases; wherein the at least one of the unequal length waveguides is temperature-compensating in that;

the second section comprises a second length of material whose refractive index decreases as temperature increases.

6. The optical apparatus of claim 5 wherein the first section of the core region is made of silica.

7. The optical apparatus of claim 6 wherein the second section of the core region is made of an elastomeric material.

8. The optical apparatus of claim 7 wherein the length of the second section is proportional to the length of the first section.

9. The optical apparatus of claim 5 wherein the refractive index of the material of the first section of the core region changes with temperature variations in a direction opposite than that of the second section of the core region.

10. The optical apparatus of claim 8 wherein the refractive index of the elastomeric material changes with temperature variations at a rate of between about −10 and about −40 times that of silica.

* * * * *